W. HOLDSWORTH.
COMBING MACHINE.
APPLICATION FILED SEPT. 20, 1916.

1,259,514.

Patented Mar. 19, 1918.
8 SHEETS—SHEET 1.

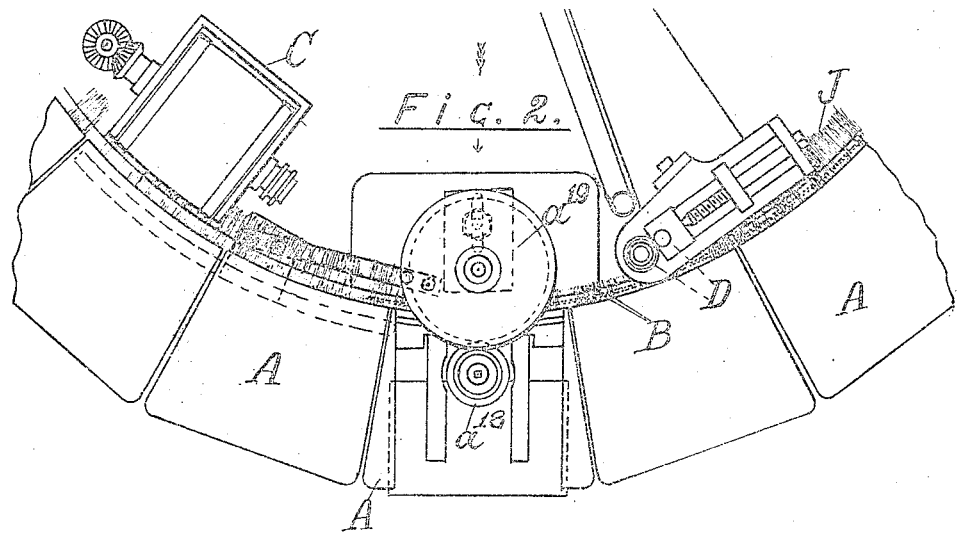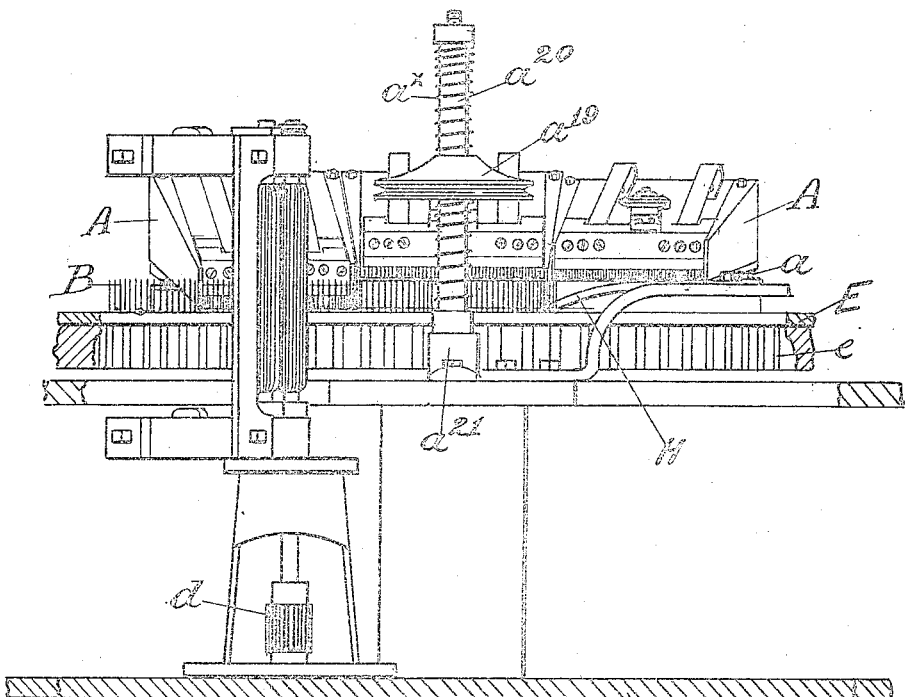

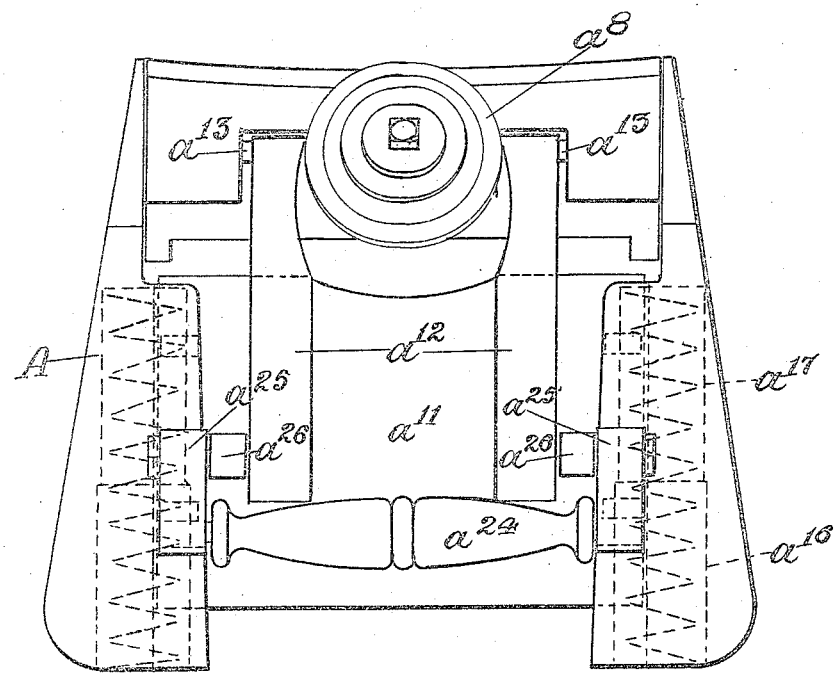
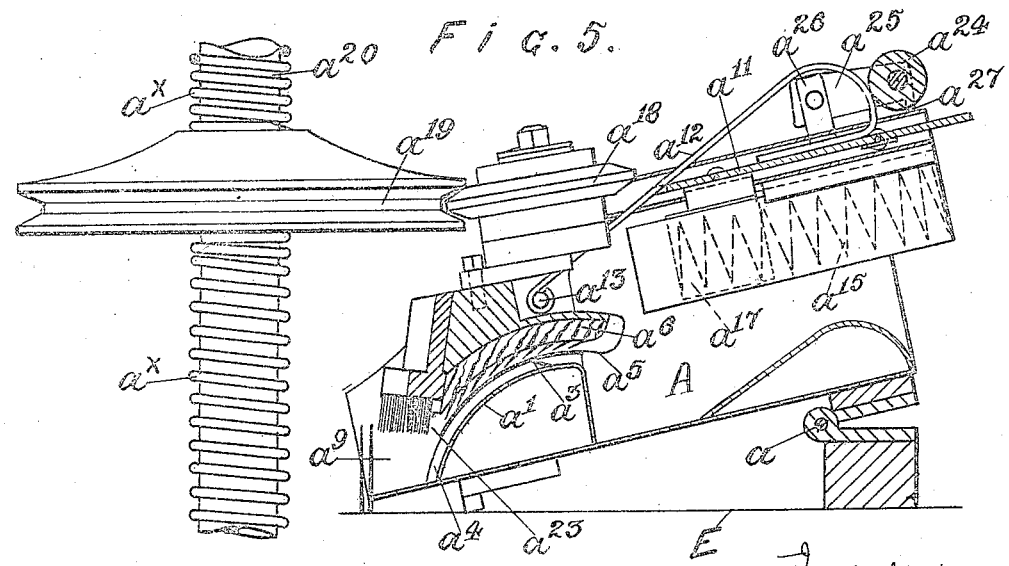

W. HOLDSWORTH.
COMBING MACHINE.
APPLICATION FILED SEPT. 20, 1916.

1,259,514.

Patented Mar. 19, 1918.
8 SHEETS—SHEET 5.

W. HOLDSWORTH.
COMBING MACHINE.
APPLICATION FILED SEPT. 20, 1916.

1,259,514.

Patented Mar. 19, 1918.
8 SHEETS—SHEET 7.

Inventor:
William Holdsworth
By Wright Brown Quinby Ray
attys

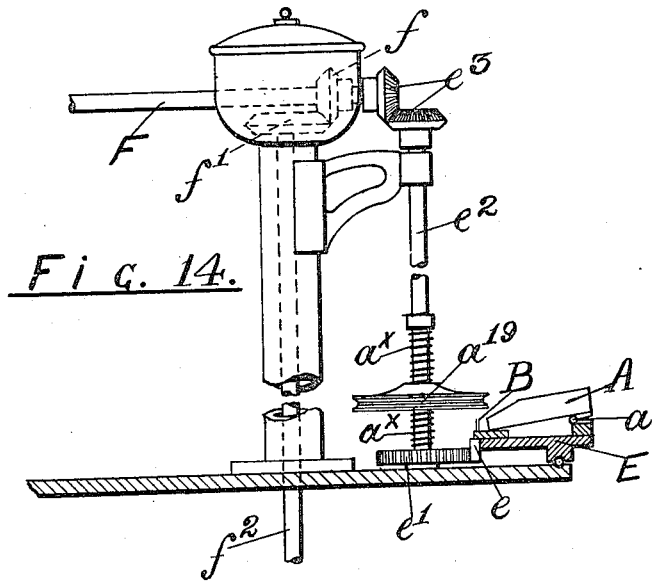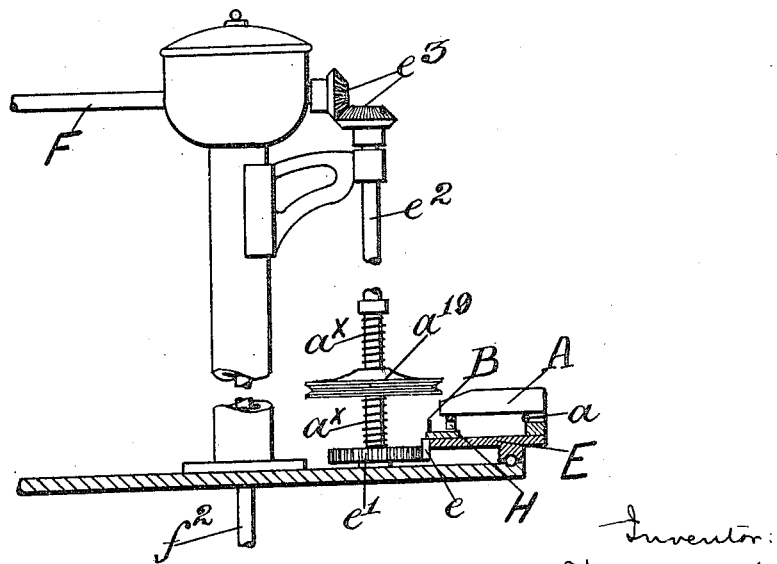

UNITED STATES PATENT OFFICE.

WILLIAM HOLDSWORTH, OF HALIFAX, ENGLAND.

COMBING-MACHINE.

1,259,514. Specification of Letters Patent. Patented Mar. 19, 1918.

Application filed September 20, 1916. Serial No. 121,332.

*To all whom it may concern:*

Be it known that I, WILLIAM HOLDSWORTH, a subject of the King of Great Britain, residing at Mount street, Halifax, in the county of York, England, have invented certain new and useful Improvements in Combing-Machines, of which the following is a specification.

This invention relates to machines primarily intended for combing wool and has for its chief object to increase the output of such machines, to provide a feed motion which can be adjusted to a nicety and will remain correct after adjustment, to simplify the construction of the machine by dispensing with small pin circles, dabbing or knife motions and several rows of pins in the large circle.

According to this invention each feed box from which the wool passes to the pin circle contains sets of pins which are capable of relative movement and act as feeding, holding and combing pins; and operating in conjunction with such boxes are a number of combing or finishing heads which comb a fringe of wool projecting from the feed box as it travels past the combing and finishing head, the combed fringe being then lowered into the pin circle and drawn off by a pair of drawing-off rollers which draw the wool staples through the pins in the feed box with the result that such staples are combed and rendered parallel. The remaining portion of the fringe projecting from the feed box is then raised clear of the pin circle and one set of pins in the feed box advanced to cause a fresh fringe to project through the feed box, whereupon the cycle of operations above described is repeated.

Both sets of pins in the feed box point toward the pin circle and are advantageously mounted in holders which respectively constitute a convex and concave arc spaced apart for the passage of the wool, the holder with the concave arc being capable of movement through a curved path toward and away from the pin circle. Situated in advance of the pins in such holder are one or more rows of pins arranged in an arc that is concentric with the pin circle and such pins lift or move away from the wool at the commencement of the backward movement of the holder and pass through the wool during the termination of the forward movement and finally occupy a vertical or approximately vertical position, or a position that is approximately parallel to the pins in the pin circle.

The combing and finishing head comprises a barrel shaped comb or brush, or combined comb and brush, the ends of the pins or bristles, or pins and bristles, forming a curve which corresponds to the curvature of the front row of pins in the holder with the concave arc, and these bristles, or bristles and pins, are rotated in close proximity to or with the bristles in contact with a stationary plate which is curved to fit the barrel shaped brush.

In the accompanying drawings:—

Fig. 2 is a plan of part of the machine drawn to a larger scale.

Fig. 3 is an elevation of part of the machine as seen from the direction indicated by the arrow in Fig. 2.

Fig. 4 is a plan of one of the feed boxes drawn to a larger scale.

Fig. 5 is a section of the feed box shown in Fig. 4 with the box in its lowered position and the slide and upper pin holder in their rear positions for feeding a fresh fringe of wool.

Fig. 12 is an end elevation and Fig. 13 a transverse section of the finishing or combing heads drawn to a larger scale and Figs. 14 and 15 are detached views showing an arrangement of gearing for transmitting motion to the pin circle from the horizontal driving shaft.

Figure 1:
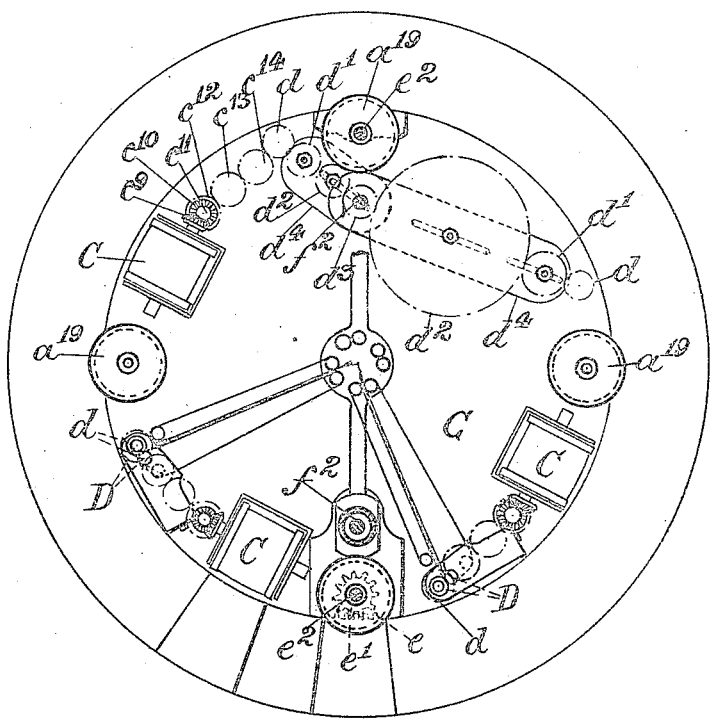
Figure 1 is a diagrammatic plan showing the position of the combing heads, drawing off rollers and gearing for operating same and pin circle.

A, A, indicate the feed boxes, B indicates the pin circle, C, C, indicate the combing or finishing heads and D, D, the drawing off rollers.

In the example shown in Fig. 1, four combing and finishing heads and four pairs of drawing off rollers are employed, but these numbers may be varied. In Fig. 1, two pairs of drawing off rollers and one combing or finishing head have been omitted to show the gearing underneath the same. Eighteen feed boxes are conveniently employed with a machine provided with four combing or finishing heads and four pairs of drawing off rollers. Each of the feed boxes is hinged at $a$ to a revolving plate E rigid with which is the pin circle B and an internal toothed ring $e$. Gearing with the latter are two toothed wheels $e^1$ mounted on vertical shafts $e^2$ driven by bevel wheels $e^3$ Figs. 14 and 15, from a horizontal shaft F such as that which is used in the Noble comb. This shaft imparts motion by bevel wheels $f$ $f^1$ to two vertical shafts $f^2$ which drive the drawing off rollers D through gear wheels $d$ $d^1$ $d^2$ $d^3$ as shown at the upper part of Fig. 1. These gear wheels are mounted upon studs carried by slotted plates $d^4$ which are hinged together, conveniently by lap joints about the centers of the shafts $f^2$ and capable of being rigidly secured to the bottom plate G in any desired angular position. The angular adjustment of the plates together with the slots therein enable various sizes of gear wheels to be used to drive the drawing off rollers at any required speed. By mounting the gear wheels on the top of the plate G they are much more accessible for lubricating, cleaning and adjustment purposes than they are in the Noble comb where they are mounted underneath the bottom plate.

Figure 6:
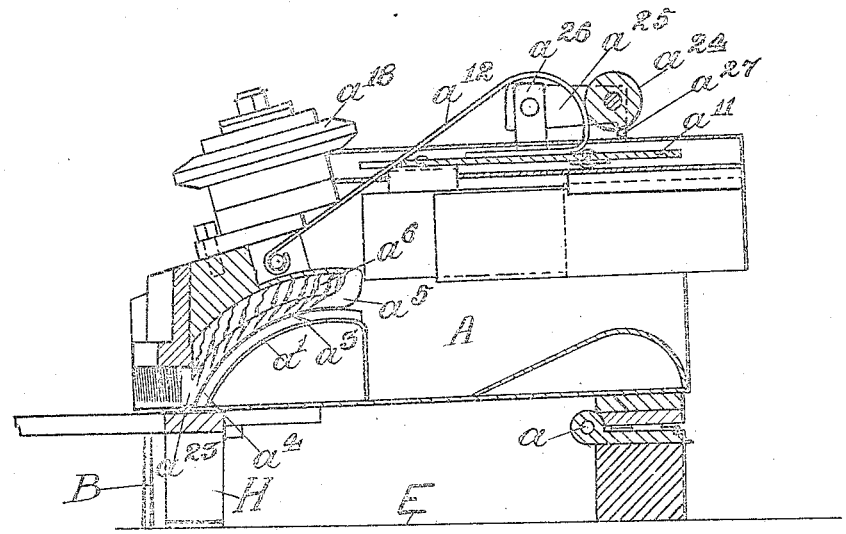
Fig. 6 is a similar view to Fig. 5 but with the box raised and the slide and upper pin holder in their forward positions.
Figure 7:
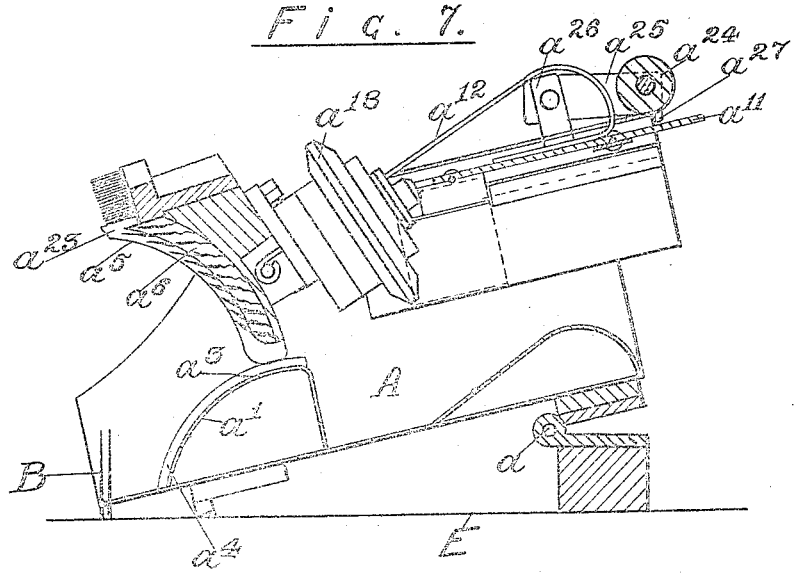
Fig. 7 is a section of the feed box with the slide in its retracted position and the upper pin holder turned up.
Figure 8:
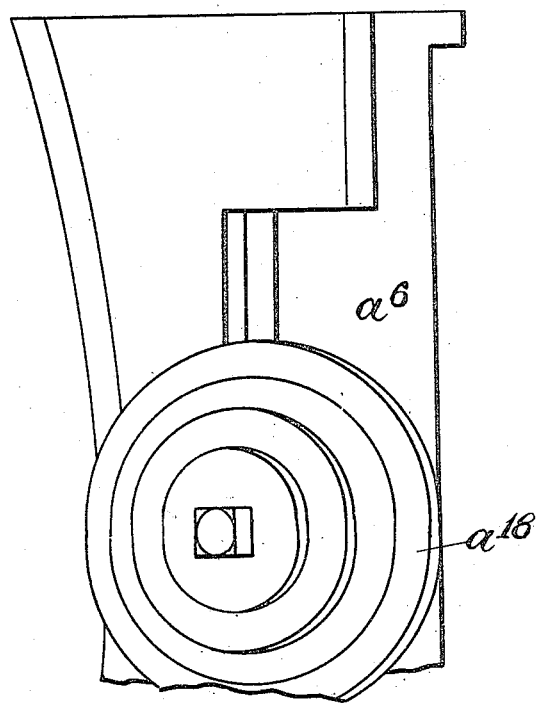
Fig. 8 is a plan and Fig. 9 an inverted plan of part of the upper pin holder drawn to a larger scale.
Figure 9:
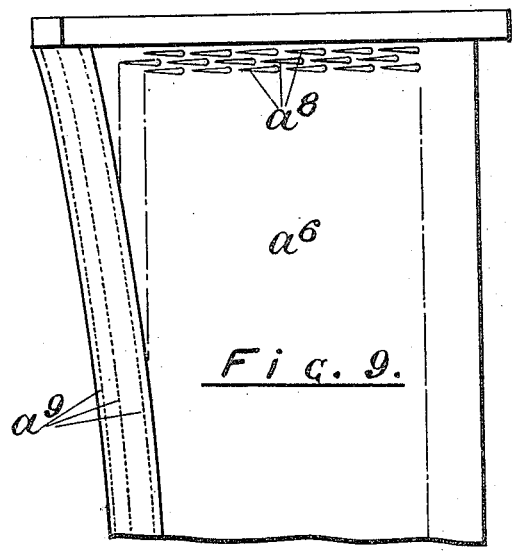
Figure 10:
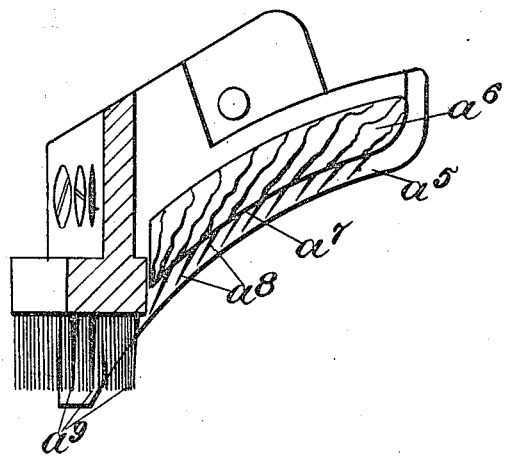
Fig. 10 is a transverse section and Fig. 11 an end elevation of the upper pin holder.
Figure 11:
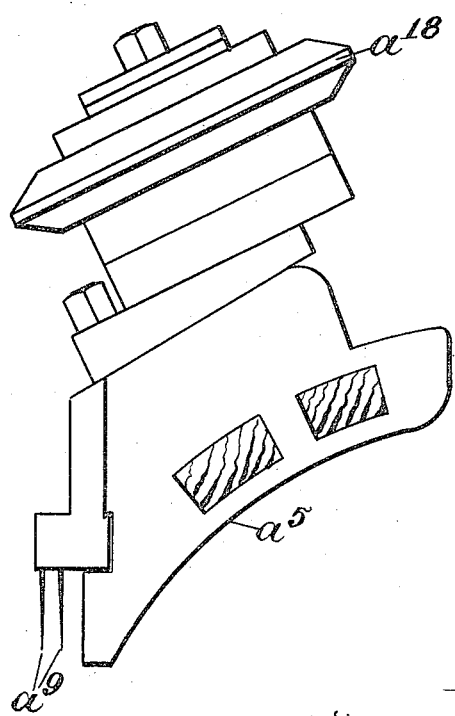
Figure 12:
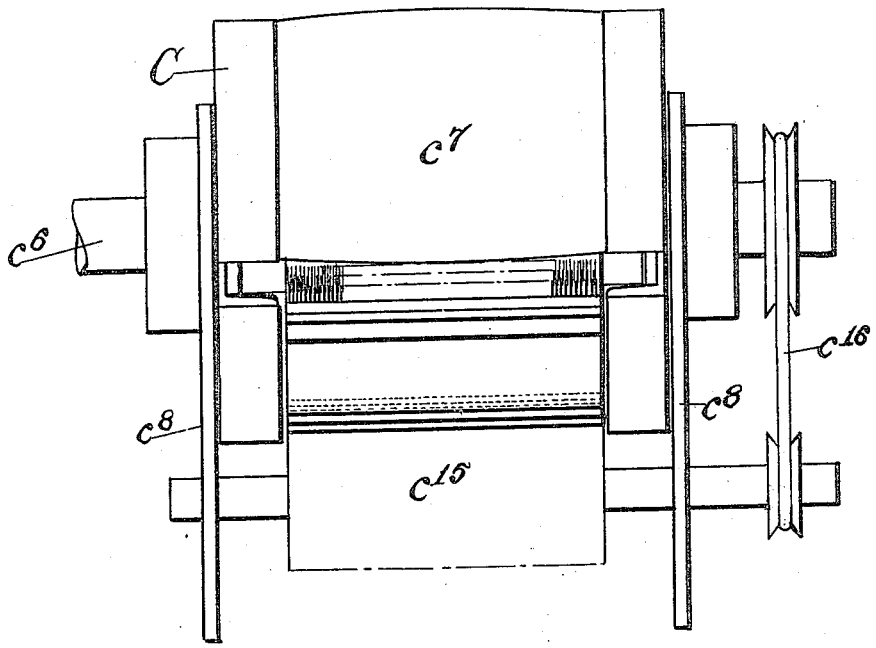
Figure 13:
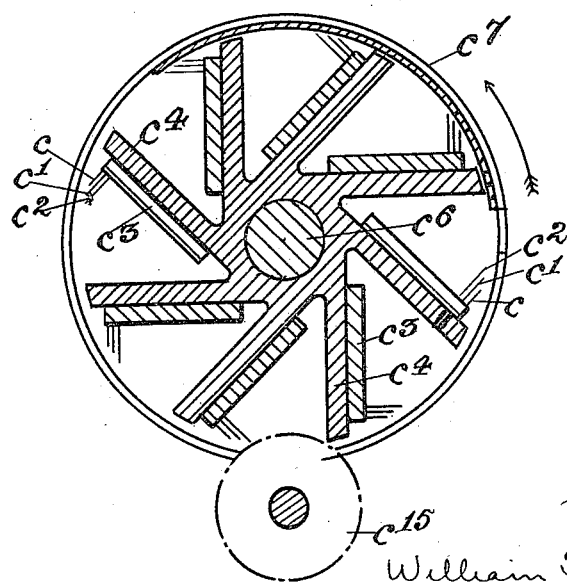

Each of the feed boxes A (Figs. 4-7) is made approximately the width of the ball of wool and either the ordinary "punched" balls may be used, or balls in which the wool is delivered to the feed boxes in the form of a single lap or sheet, the said balls being supported upon rollers or creels as in the Noble comb. These boxes are hinged at $a$ to the plate E and travel over stationary inclined surfaces H Fig. 3, situated at intervals above the top of the plate E to enable a projecting fringe of wool J Fig. 2, from the boxes to be raised clear of and lowered into the pin circle B as and when required. Extending across the bottom of each box A Figs. 5-7, is a raised surface $a^1$ convex in cross section and conveniently provided with a row of pins $a^3$ which point to the pin circle B and incline in an upward direction. If desired more than one row of such pins may be used. At the ends of the aforesaid raised surface are convex guiding surfaces $a^4$ on which rest concave guiding surfaces $a^5$ provided at the ends of a wood, metal, or other backing or holder $a^6$ having an under concave surface $a^7$ Fig. 10. Projecting from the under concave surface $a^7$ is a number of rows of pins $a^8$ which are staggered in relation to each other Fig. 9, and inclined downwardly in a direction that points to the pin circle B, and situated in advance of such pins are two or more rows of pins $a^9$ which form an arc that is concentric with the pins of the pin circle B. The pin holder $a^6$ is moved at intervals on the guiding surfaces $a^4$ toward and away from the pin circle B in the manner hereinafter described. The pin holder $a^6$ can be turned back as shown in Fig. 7 for passing the wool through the box and for enabling its pins and those on the raised surface in the box to be cleaned when required. A form of mechanism for providing for these movements comprises a slide $a^{11}$ which extends across the top of the feed box and carries a spring catch that is adapted to engage with an interlocking surface on the pin holder $a^6$ and press its guiding surface $a^5$ down upon the curved guiding surfaces $a^4$ appertaining to the lower row of pins $a^3$. In the example shown this spring catch comprises two blade springs $a^{12}$ attached to the top of the slide and engaging pins $a^{13}$ carried by the upper pin holder $a^6$. The slide $a^{11}$ is normally retained in its forward position by spring pressure and this is conveniently effected by two helical springs $a^{15}$ compressed between the ends of pockets $a^{16}$ formed on or attached to the underside of the top of the feed box and two pockets $a^{17}$ projecting from the slide. A form of apparatus for effecting the withdrawal of the slide comprises a wheel $a^{18}$ carried by the upper pin holder $a^6$ and a wheel $a^{19}$ slidably mounted on a stud or shaft $a^{20}$ on a bracket $a^{21}$ that may be arranged to have its position accurately adjusted toward and away from the pin circle. The wheel $a^{19}$ has a groove $a^{22}$ which interlocks with the peripheral portion of the wheel $a^{18}$ during the withdrawal of the upper pin holder. Situated above and below the wheel $a^{19}$ is a spring $a^x$. When the wheel $a^{18}$ comes in contact with the wheel $a^{19}$, the latter forces the wheel $a^{18}$ backward and the pressure exerted on the wheel $a^{19}$ by the upper spring $a^x$ holds the feed box firmly down upon the plate E during the aforesaid backward movement of the slide. Immediately the wheel $a^{18}$ leaves the wheel $a^{19}$, the slide together with the upper pin holder $a^6$ is shot forward by the springs $a^{15}$ to effect the feed, the point side of the inclined pins in the upper pin holder $a^6$ carrying the wool over the inclined backs of the pins in the lower pin holder. During the completion of the forward movement, the pins $a^9$ in advance of the pins $a^8$ travel down through the wool until their points arrive close to the bottom of the feed box, stops $a^{23}$ being provided to prevent the pins coming into contact with the bottom of the box. Simultaneously, or almost simultaneously with this movement the feed box is raised by traveling over a stationary cam surface H Fig. 3 so that the fresh fringe of wool will lie above the points of the pins in the pin circle. At the commencement of the return or backward movement of the upper pin holder, the pins therein are raised from the wool in the feed box and the inclined backs of the upper pins pass over the wool which is held during this movement by the point side of the lower pins. By this arrangement a positive and correct feed is obtained, the wool being held at all times by the pins in the box and prevented from slipping backward out of the box. The length of feed is controlled by the movement imparted to the wheel $a^{18}$ by the wheel $a^{19}$ and the amount of this movement can be regulated to a nicety by adjusting the position of the bracket $a^{21}$, or by substituting a larger or smaller wheel $a^{19}$ for the one shown. Each feed box is provided with a handle $a^{24}$ having arms $a^{25}$ pivoted to lugs $a^{26}$ on the slide $a^{11}$ and having catches $a^{27}$ Fig. 7 adapted to engage the back of the box and to hold the slide in its retracted position. When the slide is in this position the upper pin holder can be turned back as shown in Fig. 7, and the pins therein and in the lower holder cleaned. Each of the combing or finishing heads C occupies a position within and above the pin circle B and carries the rotary barrel shaped brush or comb previously referred to. In the example shown in Figs. 12 and 13, a comb is used comprising by way of example three rows of pins $c\ c^1\ c^2$ mounted in a plate $c^3$ that is attached to a tangential arm $c^4$ carried by a shaft $c^6$. Eight of these combs are used and the outer row of pins $c$ is the shortest and most finely spaced, each remaining row being successively longer and more widely spaced. The pins may also increase in strength from the outer to the inner row and the various rows may be staggered in relation to each other. The combs so constructed and arranged are partly surrounded by a plate $c^7$ which is curved longitudinally and transversely as shown in Figs. 12 and 13. This plate is attached to two supports $c^8$ which are carried by the machine frame and provided with ball or other bearings for the shaft $c^6$. The comb may be driven from any part of the machine and is conveniently driven by bevel wheels $c^9\ c^{10}$ Fig. 1 from a vertical shaft $c^{11}$ on which is a toothed wheel $c^{12}$ driven from the toothed wheel $d$ through two idle wheels $c^{13}\ c^{14}$. $c^{15}$ Fig. 13 represents a brush for stripping the noil from the comb pins, the noil falling into a box or other suitable receptacle. This brush is conveniently driven by a belt or chain $c^{16}$ from the shaft $c^6$.

To pass the wool through the boxes in the first instance the slides are retracted by hand and the upper pin holders turned back. The laps or sheets of wools are then drawn from the "punched" or other balls of wool and passed through the feed boxes by hand and pressed down into the pin circle. When the machine is in operation, after a feed box passes a pair of drawing off rollers and while the wool that has not been drawn off by such rollers remains in the pin circle, held down by a feed knife (not shown) in the ordinary manner, the wheel $a^{18}$ on the upper pin holder comes into contact with the wheel $a^{19}$ which then operates in the manner described to push the upper pin holder back, and at the same time to press the feed box down, the wool being held by the pins in the pin circle and also by the lower row of pins in the feed box during the backward movement of the upper pin holder. Immediately the wheel $a^{18}$ leaves the wheel $a^{19}$ the box is tilted by the stationary cam surface to raise the wool clear of the pin circle B and the upper pin holder is shot forward by its springs thereby causing a new fringe of wool to project through the front pins $a^9$ in the feed box. While the latter is in a raised position it travels past one of the combing heads whereupon the projecting fringe is caught by the pins or bristles on the barrel shaped brush and lifted up against the lower edge of the curved plate and combed by the pins or bristles, or pins and bristles revolving in contact with or in proximity to the plate. After the combed fringe has traveled past the combing head the feed head travels down an incline or is lowered to bring the combed fringe into the pins of the pin circle and this operation is assisted or completed by the usual feed knife in the ordinary manner. When the combed fringe arrives at the next pair of drawing off rollers it is caught by them and the staples of wool belonging to such fringe that are in the feed box are drawn between the convex and concave surfaces and through the various rows of pins in the feed box whereby they are straightened out and combed. After the feed box leaves the drawing off rollers the feed motion appertaining to such box is again put into action and the cycle of operations repeated.

By the invention described, all the rows of pins on the pin circle except two can be dispensed with, owing to their function being performed by the pins in the feed boxes, the feed is rendered positive and accurate and owing to the feed being effected during a very small portion of a revolution of the pin circle four or more pairs of drawing off rollers and combing and finishing heads can be used on an ordinary size of combing machine with the result that the production of such machine is doubled or more than doubled, and a pin circle having a larger diameter can be conveniently used on a machine of ordinary size with the result that the production of the machine is still further increased.

The machine is provided with the ordinary steam chest below the pin circle and the various slivers are conducted by their leathers to a funnel in the usual manner.

What I claim as my invention and desire to secure by Letters Patent in the United States is:—

1. In a combing machine, a feed box and means for carrying it in an endless path, means in said box for feeding fibrous material therefrom, means for effecting the operation of said feeding means, means for combing the fed material, and means for drawing off the finished material.

2. In a combing machine, a feed box and means for carrying it in an endless path, means in said box for combing and feeding fibrous material therefrom, means for effecting the operation of said combing and feeding means, means outside said box for combing the fed material, and means for drawing off the finished material.

3. In a combing machine, a feed box and means for carrying it in an endless path, means in said box for combing and feeding fibrous material therefrom intermittently, means for effecting the operation of said combing and feeding means, means outside said box for combing the fed material, and means for drawing off the finished material.

4. In a combing machine, a plurality of feed boxes, means for carrying them in an endless path, means in each of said boxes for feeding fibrous material therefrom, means for operating said feeding means in each of said boxes in sequence, means for combing in sequence the material fed from said boxes, and means for drawing off the combed material.

5. In a combing machine, a feed box and means for carrying it in an endless path, means in said box for combing and feeding fibrous material, said means comprising a lower series of pins and an upper series of pins, said upper series of pins being arranged to point downwardly and in the direction of feed and being mounted in a holder arranged to reciprocate relatively to said lower series of pins so that said upper pins will feed fibrous material intermittently, means for reciprocating said holder for the upper pins, the pins of said lower series being pointed upwardly and in the direction of feed so as to prevent backward movement of the fibrous material, means for combing the fed material, and drawing-off means.

6. In a combing machine, a plurality of feed boxes, means for carrying them in an endless path, means in said boxes for combing and feeding fibrous material therefrom, said means comprising a lower series of pins and an upper series of pins, said upper series of pins being arranged to point downwardly and in the direction of feed and being mounted in a holder arranged to reciprocate relatively to said lower series, the pins of said lower series being pointed upwardly and in the direction of feed, means for causing reciprocation of said holders for the upper pins in sequence, means outside said boxes for combing the fed material, and drawing-off means.

7. In a combing machine, a movable feed box, means in said box for feeding fibrous material therefrom, means for operating said feeding means, combing means, drawing-off means, and means for moving said box to carry the fed material into position to be combed by said combing means and then to carry the combed material into position to be drawn off by said drawing-off means.

8. In a combing machine, movable feed boxes, means in said boxes for feeding fibrous material therefrom, means for operating said feeding means as the moving boxes reach feeding position, combing means, drawing-off means, and means for moving said boxes to carry the fed material into position to be combed by said combing means and to carry the combed material into position to be drawn off by said drawing-off means.

9. In a combing machine, a feed box and holding pins, said box and pins being movable in an endless path, means in said box for feeding fibrous material therefrom, means for operating said feeding means, combing means, drawing-off means, and means for moving said box to carry the fed material above said pins in position to be combed by said combing means and to permit the box to descend to carry the combed material on to said pins in position to be drawn off by said drawing-off means.

10. In a combing machine, a feed box provided with two series of pins, one of said series being mounted in a relatively stationary holder and the other of said series being mounted in a holder reciprocable relatively to said stationary holder, said holders being arranged in lapped relation, the pins in said reciprocable holder being arranged to feed fibrous material from said feed box while the reciprocable holder is moving in one direction, and the pins in said stationary holder being arranged to prevent backward movement of said fibrous material while said reciprocable holder is moving in the other direction, and means for reciprocating said reciprocable holder.

11. In a combing machine, a feed box provided with two series of pins, one of said series being mounted in a relatively stationary holder and the other of said series being mounted in a holder reciprocable relatively to said stationary holder, said holders being arranged in lapped relation, the pins in said reciprocable holder being arranged to feed fibrous material from said feed box while the reciprocable holder is moving in one direction, and the pins in said stationary holder being arranged to prevent backward movement of said fibrous material while said reciprocable holder is moving in the other direction, and means for reciprocating said reciprocable holder, said reciprocating means and said holder being capable of relative adjustment to vary the feeding movement of said reciprocable holder.

12. In a combing machine, a feed box provided with two series of pins, one of said series being mounted in a relatively stationary holder and the other of said series being mounted in a holder reciprocable relatively to said stationary holder, said holders being arranged in lapped relation, the pins in said reciprocable holder being arranged to feed fibrous material from said feed box while the reciprocable holder is moving in one direction, and the pins in said stationary holder being arranged to prevent backward movement of said fibrous material while said reciprocable holder is moving in the other direction, and means for reciprocating said reciprocable holder, said reciprocable holder being movable out of operative position.

13. In a combing machine, a traveling feed box having a reciprocable holder provided with pins arranged to feed fibrous material from said box when said holder is moving in one direction, and a second set of pins arranged in said box to act as holding and combing pins after the feed has been effected, and means for reciprocating said reciprocable holder.

14. In a combing machine, a traveling feed box provided with two sets of pins mounted in a reciprocable holder, one set being arranged to feed fibrous material from said feed box while the reciprocable holder is moving in one direction and the other set being arranged to act as holding and combing pins after the feed has been effected, and means for reciprocating said reciprocable holder.

15. In a combing machine, a feed box movable to supply a plurality of combing and finishing heads, means for moving said box to and from supplying position, feeding means arranged in said box and including a reciprocable holder provided with two sets of pins, one of said sets being arranged to feed fibrous material from said box while said holder is moving in one direction and the other set being arranged to act as holding and combing pins after the feed has been effected, and means for reciprocating said holder.

In testimony whereof I affix my signature.

WILLIAM HOLDSWORTH.

Witnesses:
G. P. APPLEYARD,
A. LAWSON.

Copies of this patent may be obtained for five cents each, by addressing the "Commissioner of Patents, Washington, D. C."